United States Patent [19]

Uratani et al.

[11] Patent Number: 5,610,850

[45] Date of Patent: Mar. 11, 1997

[54] ABSOLUTE DIFFERENCE ACCUMULATOR CIRCUIT

[75] Inventors: Munehiro Uratani, Yamatokoriyama; Aoi Kitaura, Tenri, both of Japan

[73] Assignee: Sharp Kabushiki Kaisha, Osaka, Japan

[21] Appl. No.: 305,753

[22] Filed: Sep. 14, 1994

Related U.S. Application Data

[63] Continuation of Ser. No. 34,407, Mar. 18, 1993, abandoned.

[30] Foreign Application Priority Data

Jun. 1, 1992 [JP] Japan .................................. 4-140486

[51] Int. Cl.$^6$ ........................................................ G06F 7/50
[52] U.S. Cl. ................................. 364/769; 364/715.01
[58] Field of Search ................................ 364/769, 715.01

[56] References Cited

U.S. PATENT DOCUMENTS

| | | | |
|---|---|---|---|
| 4,761,759 | 8/1988 | Nakagawa | 364/769 |
| 4,908,788 | 3/1990 | Fujiyama | 364/715.08 |
| 4,953,115 | 8/1990 | Kanoh | 364/715.01 |
| 5,040,136 | 8/1991 | Kanoh | 364/715.01 |
| 5,216,628 | 6/1993 | Mizutani et al. | 364/715.01 |

OTHER PUBLICATIONS

"A Floating–Point Cell Library and a 100 Mflops Digital Signal Processor", by C. Hori et al, Electric Information Communication Institution, Technological Search Report, pp. 97–104, Mar. 6, 1992.

*Primary Examiner*—Tan V. Mai

[57] ABSTRACT

The absolute difference calculation circuits 101 through 10N each consisting of a subtractor which calculates the difference of two numbers each consisting of i bits and a bit inversion selector circuit which provides the result of subtraction as it is when no borrow output is produced by the subtractor, and inverts every bit of the result of subtraction when there is a borrow output, to obtain 1's complement of the absolute value of difference. The multiple input adder 2 receives the borrow as input to the least significant bit thereof and adds the result of each absolute difference calculation circuit. Because the adding operations to obtain 2's complement in the absolute difference calculation circuit are carried out together in the multiple input adder that follows, number of adders required to calculate the absolute value of difference can be greatly reduced and the amount of entire circuitry can be greatly reduced.

12 Claims, 13 Drawing Sheets

Fig. 1

PICTURE A

| A1 | A2 | . | . | . | . | Ak |
|----|----|----|----|----|----|----|
| Ak+1 | Ak+2 | . | . | . | . | A2k |
| . | . | | | | . | . |
| . | . | | . | | . | . |
| . | . | . | | . | | . |

PICTURE B

| B1 | B2 | . | . | . | . | Bk |
|----|----|----|----|----|----|----|
| Bk+1 | Bk+2 | . | . | . | . | B2k |
| . | . | | | | . | . |
| . | . | | . | | . | . |
| . | . | . | | . | | . |

Fig.9 PriorArt

ABSOLUTE DIFFERENCE ACCUMULATOR CIRCUIT

This application is a continuation of application Ser. No. 08/034,407 filed on Mar. 18, 1993, now abandoned.

BACKGROUND OF THE INVENTION

1. Field of the Invention

The present invention relates to an absolute difference accumulator circuit which is used to determine the correlation between two sets of data and other purposes.

2. Description of the Related Art

Figure 1:
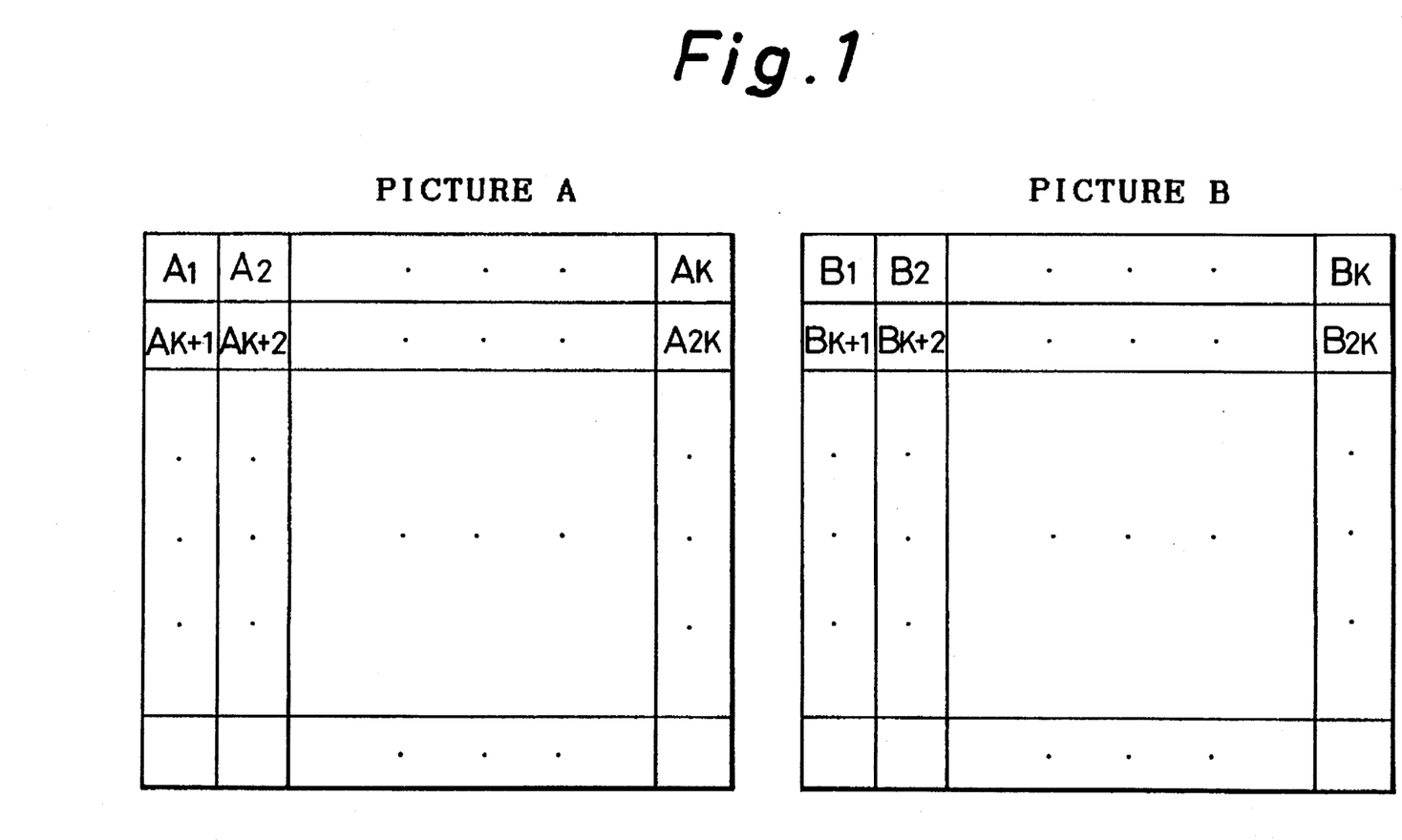
FIG. 1 shows an example of image data in case of determining the correlation of two sets of image data.

Correlation between two sets of image data has been computed for pattern matching of different image data, for example, in the field of image processing technology. Correlation between two sets of image data is determined by calculating the absolute value of the difference of pixel data at the same coordinate between the two sets of image data for each pixel, and summing up the differences. In FIG. 1, for example, to determine the correlation between two sets of image data represented by two pictures A and B, absolute values of $(A_1-B_1)$, $(A_2-B_2)$, $(A_3-B_3)$, ... $(A_k-B_k)$ ... are calculated successively, with the absolute values of differences summed up, thereby to obtain the value which represents the correlation, where $A_1$ through $A_K$ and $B_1$ through $B_k$ represent the gradations of the pixel data at the respective coordinates, which may be denoted as A and B by omitting the suffix to collectively represent the image data.

Arithmetic operations as described above constitute the indispensable technique particularly in the process of detecting the motion vectors between frames, which is used in encoding of moving images.

Figure 2:
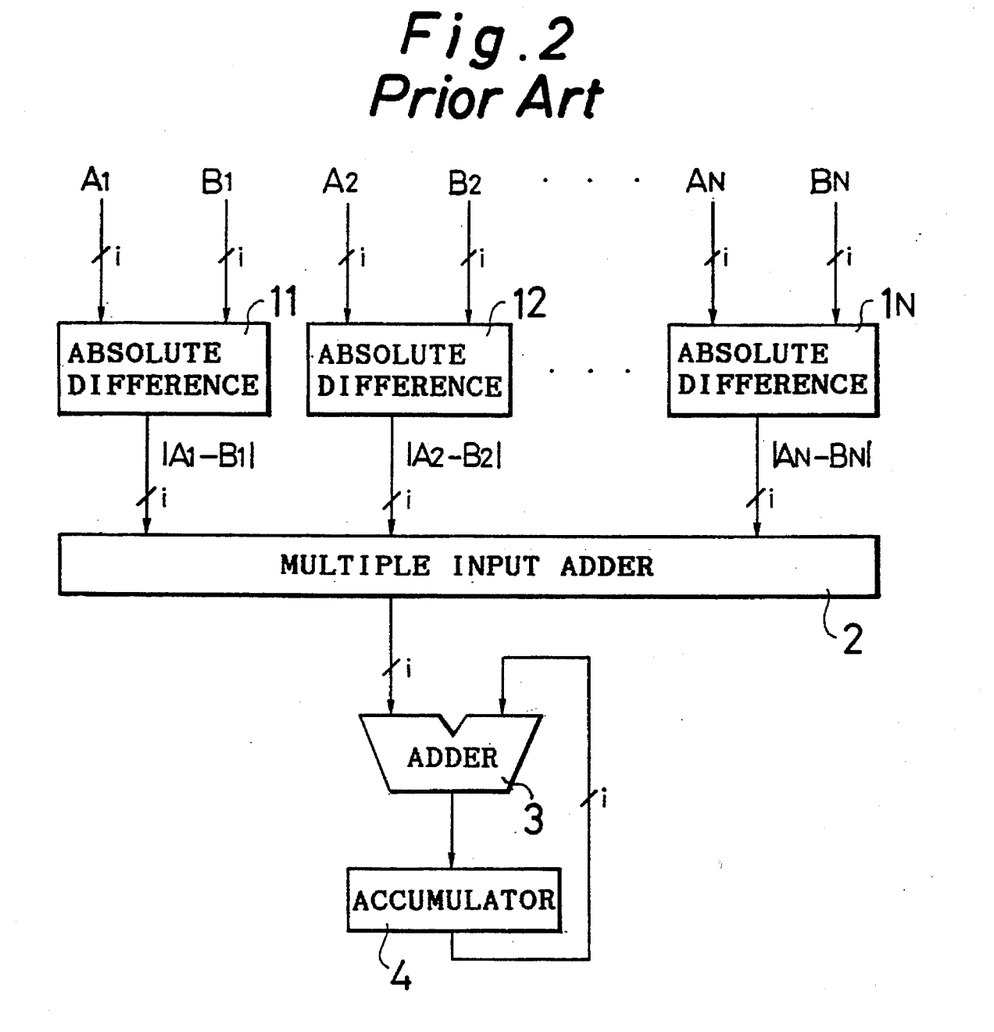
FIG. 2 shows an example of the construction of the absolute difference calculation circuit of the prior art.

FIG. 2 shows the construction of an absolute difference accumulator circuit of the prior art. In FIG. 2, $A_1, A_2, \ldots, A_N$ represent N pieces of first data each consisting of i bits, which correspond, for example, to the data of N pixels $A_1$ through $A_N$ among the image data of picture A shown in FIG. 1. Also in FIG. 2, $B_1, B_2, \ldots, B_N$ represent N pieces of second data each consisting of i bits, which correspond to the data of N pixels $B_1$ through $B_N$ among the image data of picture B shown in FIG. 1, where N and k generally have a relation of inequality N<k. In FIG. 2, numerals 11, 12, ..., 1N denote an difference calculation circuit. Absolute difference calculation circuit 11 calculate the absolute value of $A_1-B_1$, absolute difference calculation circuit 12 calculates the absolute value of $A_2-B_2$, and absolute difference calculation circuit 1N calculates the absolute value of $A_N-B_N$. Multiple input adder 2 sums up all outputs of the N absolute difference calculation circuits 11, 12, ..., 1N. Adder 3 stores the result of addition from the multiple input adder 2 into accumulator 4 and, upon receipt of the next result of addition from the multiple input adder 2, adds the result of addition to the contents of the accumulator 4. Therefore, such a circuit as described above can be used to obtain the sum of the absolute differences in the accumulator 4, by successively entering the pixel data $A_1, A_2, \ldots, A_n$ and $B_1, B_2, \ldots, B_n$ as the image data of picture A and picture B changes.

Figure 3:
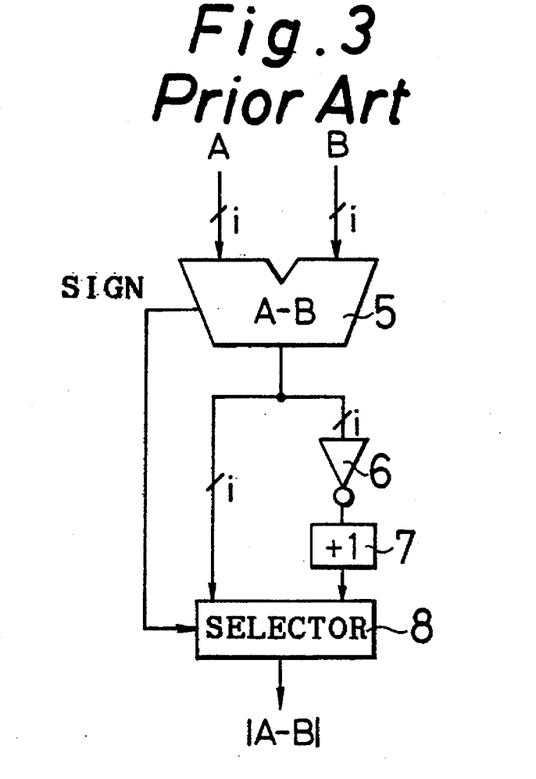
FIG. 3 shows an example of composition of absolute difference calculation circuit 11 through 1N shown in FIG. 2.
Figure 4:
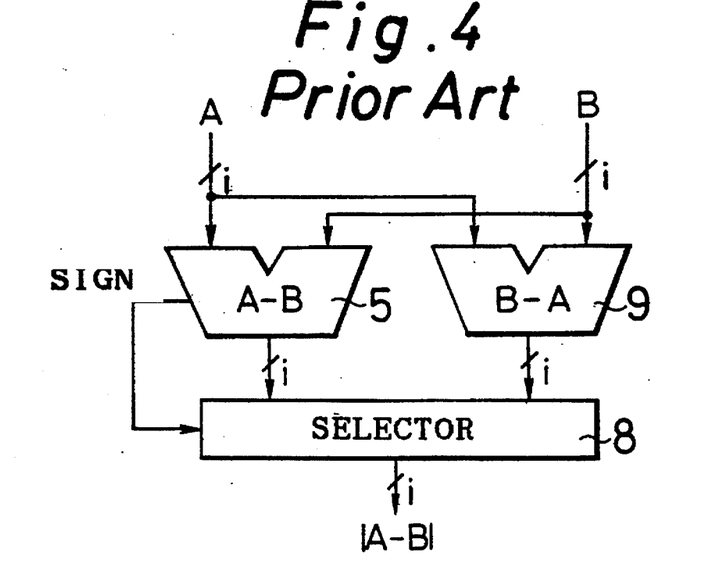
FIG. 4 shows another example of composition of absolute difference calculation circuit shown in FIG. 2.

FIG. 3 and FIG. 4 show two different compositions of the absolute difference calculation circuit 11, 12, ..., 1N shown in FIG. 2. In FIG. 3 numeral 5 denotes an i-bit subtractor, numeral 6 denotes a bit inverter for i bits and numeral 7 denotes a +1 incrementer for the least significant bit. The bit inverter 6 and the +1 incrementer 7 are used to obtain 2's complement. Selector 8 provides as output the result of subtraction from the subtractor 5 when the result as positive sign (sign bit is 0), or provides 2's complement of the result of subtraction when the result negative sign (sign bit is 1). Accordingly absolute value of A−B is obtained.

In FIG. 4, numeral 5 denotes a subtractor which calculates A−B and numeral 9 denotes a subtractor which calculates B−A. Selector 8 provides as output the result of subtraction from the subtractor 5 when the result of subtraction of the subtractor 5 is positive (sign bit is 0), or provides as output the result of subtraction in the subtractor 9 when the result of subtraction in the subtractor 5 is negative (sign bit is 1), because the result of subtraction in the subtractor 9 becomes positive.

Figure 5:
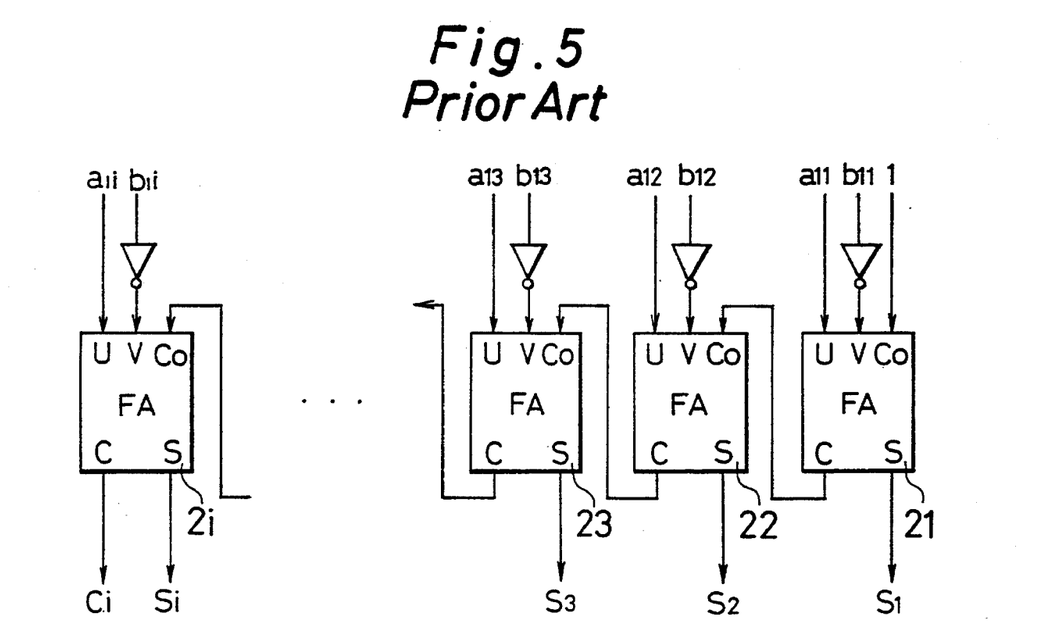
FIG. 5 shows an example of composition of the i-bit subtractor 5 and the i-bit subtractor 9 shown in FIG. 3 and FIG. 4.

FIG. 5 shows an example of the circuit construction of the subtractor 5 and the subtractor 9 of the absolute difference calculation circuit shown in FIGS. 3 and 4. The subtractors 5 and 9 comprise i units of full adders (abbreviated as FA). When a carry is generated in an adder, the carry is sent from a carry output terminal C of the adder, where the carry is generated, to the carry input terminal Co of the adder of the next more significant bit. Applied to the input terminals U of the adders 21 through 2i are input data a11 through a1i as minuends. Applied to the input terminals V are input data b11 through b1i, each bit being inverted ("1" is replaced with "0" and "0" is replaced with "1") as subtrahends. Carry input terminal Co of the least significant bit receives data "1" so that 1 is added to the inverted bits of the input data b11 through b1i. Consequently, because the input data a11 through a1i and 2's complement of the input data b11 through b1i are added, the result is the difference between the input data a11 through a1i and 2's complement of the input data b11 through b1i. The results of subtracting operations S1 through Si and carrys Ci are provided as output at the output terminals S of the adders 21 through 2i and carry output terminals of the adder 2i of the most significant bit. If the result of subtraction is positive, carry Ci is "1" and if the result is negative the carry Ci is "0", thereby enabling it to know the sign of the result of subtraction by the carry Ci.

Figure 6:
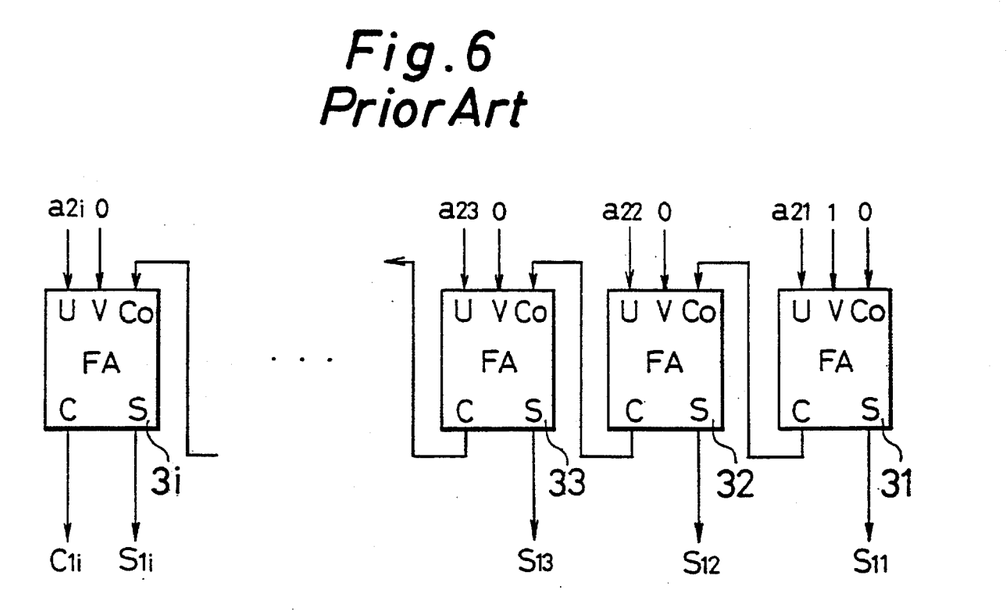
FIG. 6 shows an example of composition of the +1 incrementer 7 shown in FIG. 3.

FIG. 6 shows the circuit construction of +1 incrementer 7 of the absolute difference calculation circuit shown in FIG. 3. The +1 incrementer 7 comprises i units of full adders (abbreviated as FA) 31 through 3i. When a carry is generated in an adder, the carry is sent from the carry output terminal Co of the adder, where the carry is generated, to a carry input terminal C of the adder where addition of the next more significant bit is performed. Applied to the input terminals U of the adders 31 through 3i are input data a21 through a2i as augends. Applied to the input terminals V of the adder 31 of the least significant bit is data "1" as addend. Thus with input terminals V of the adders 32 through 3i of other more significant bits being fixed to 0, adding operation is performed. Upon completion of the adding operation, the sums S11 through S1i and carrys C1i are provided as output at the output terminal S of the bit adders 31 through 3i and the carry terminal C of the adder 3i of the most significant bit, respectively. Input data at the carry input terminal Co of the adder 31 of the least significant bit is fixed at 0.

Figure 7:
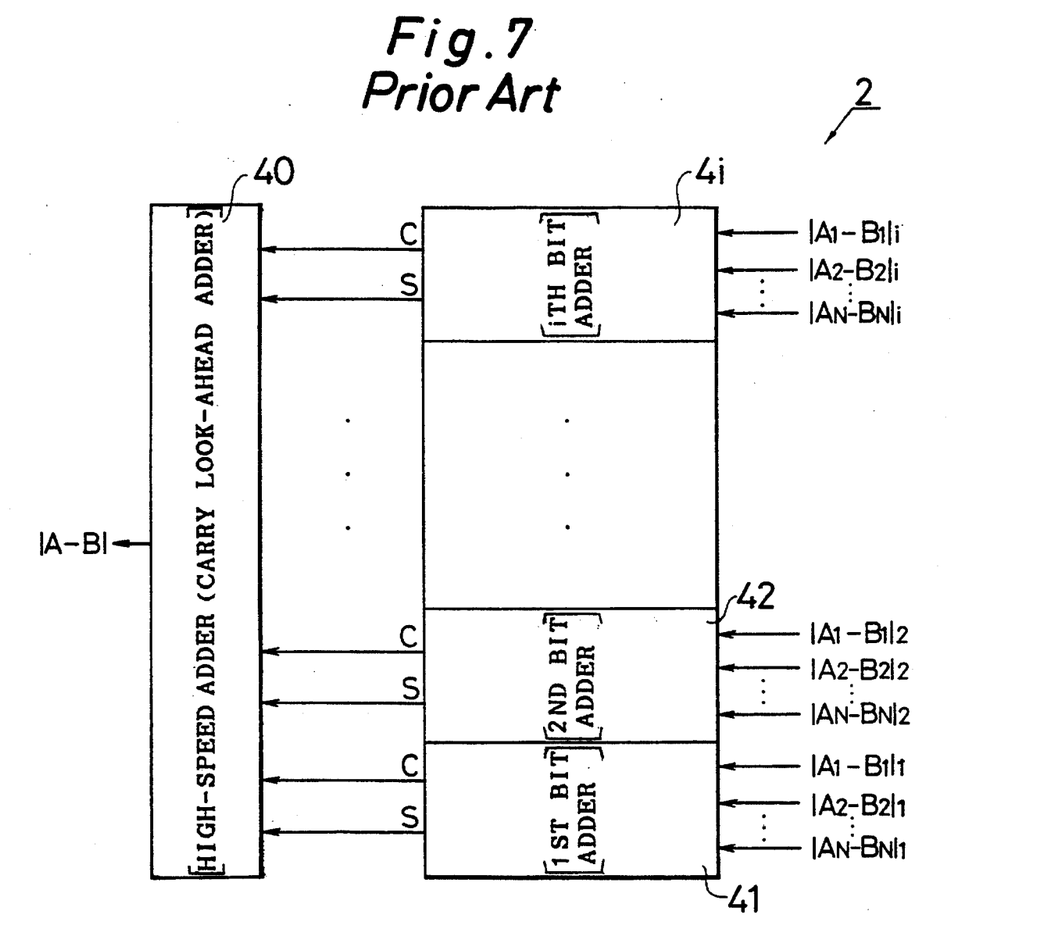
FIG. 7 shows an example of the construction of the multiple input adder 2 shown in FIG. 2.

FIG. 7 shows the composition of the multiple input adder 2 shown in FIG. 2. In FIG. 7, 1st bit adder 41, 2nd bit adder 42, ..., i th bit adder 4i add the value of |A−B| for the first bit, second bit, ..., ith bit, respectively. |A−B|i represents the value of ith bit of |A−B|. The first bit adder 41 through ith bit adder 4i are multiple input adders for N inputs. The ith bit adder 4i, for example, adds the ith bits of the results of calculations by the N absolute difference calculation circuit 11 through 1N, and the first bit adder adds the first bits of the output values provided by the N absolute difference calculation circuit.

Figure 8:
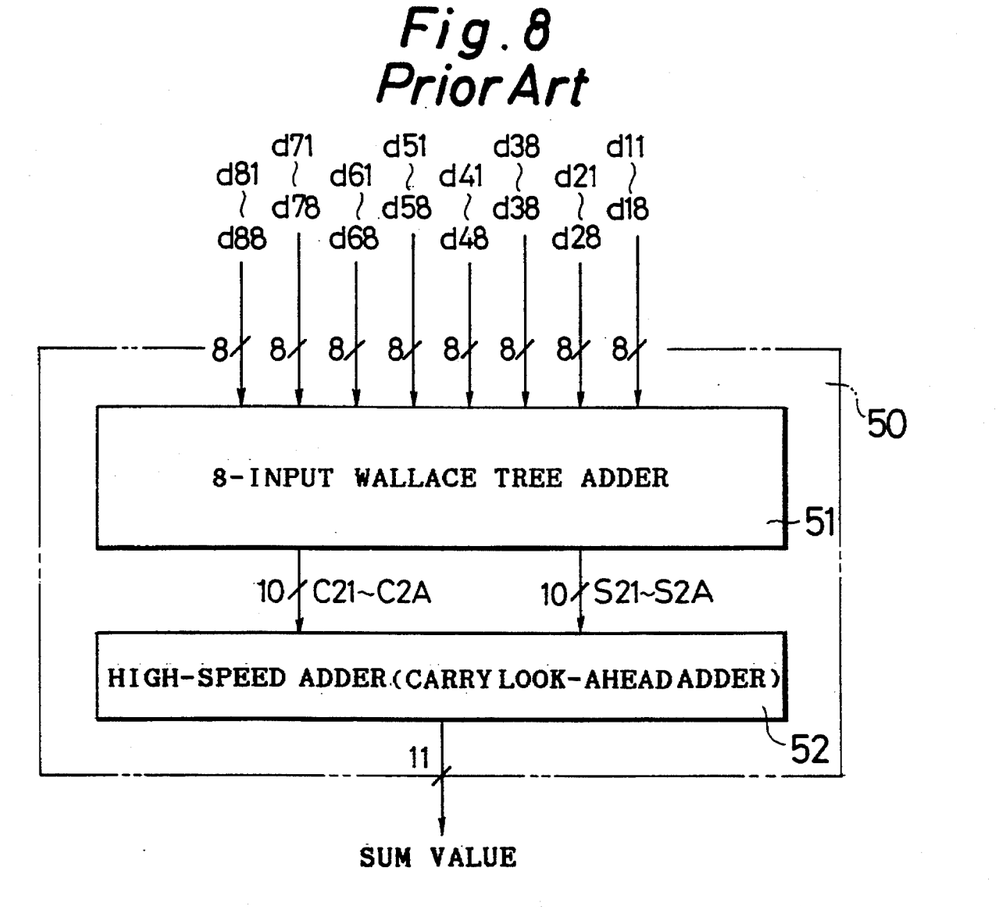
FIG. 8 shows an example of construction of the multiple input adder 2 in FIG. 7.
Figure 9:
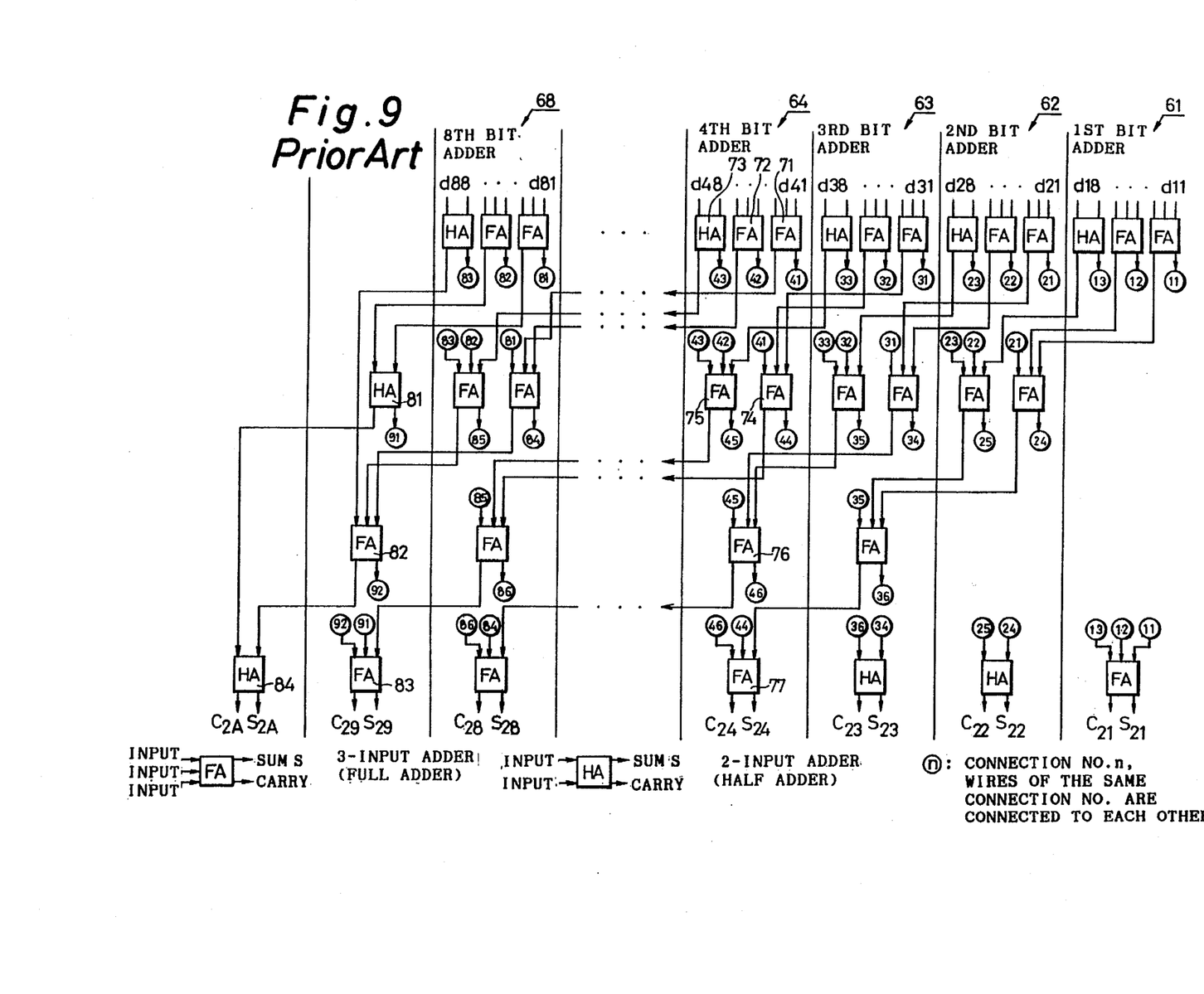
FIG. 9 shows an example of the circuit diagram of the 8-input Wallace Tree adder circuit 51 shown in FIG. 8.

For such a multiple input adder as described above, a Wallace Tree adder circuit can be used. FIG. 8 shows an example of the composition of an 8-input multiple input adder. The 8-input adder 50 comprises an 8-input Wallace Tree adder circuit 51 and a 2-input high-speed adder (carry look-ahead adder) 52. FIG. 9 shows the circuit diagram of the 8-input Wallace Tree adder circuit 51.

The 8-input Wallace Tree adder circuit 51 comprises a 1st bit adder 61 through 8th bit adder 68, with the nth bit adder receiving the nth bit input data dn1 through dn8. Each bit adder basically comprises a plurality of 3-input adders, each of which successively adding the input data and the carry input from the bit adder of less significant bit, and sending the carry to the bit adder of more significant bit. Adders of each bit adder are arranged in a tree structure as shown in FIG. 9, where the number of inputs at the latter stage decreases to calculate and provide the outputs of carry C and sum S in the bit adder as output at the last stage. Thus adding operations can be performed efficiently with a reduced number of adders by having each bit adder to perform addition.

In the 4th bit adder 64, for example, adder 71 adds input data d41 through d43, adder 72 adds input data d44 through d46, and adder 73 adds input data d47 and d48. Adders 71 through 73 send the sum S of the input data to adders 74 and 75 and send carry C to the 5th bit adder 65. The adder 74 adds the carry C sent from the 3rd bit adder 63 and the sum S sent from the adder 71, and the adder 75 adds the carry C sent from the 3rd bit adder 63 and the sum S sent from the adders 72 and 73. The adder 74, upon addition of said data, sends the sum S to the adder 77 and sends the carry C to the 5th bit adder 65. The adder 75, upon addition of said data, sends the sum S to the adder 76 and sends the carry C to the 5th bit adder. The adder 76 adds the carry C sent from the 3rd bit adder 63 and the sum S sent from the adder 75, sends the sum S to the adder 77 and sends the carry C to the 5th bit adder. The adder 77 adds the carry C sent from the 3rd bit adder and the sum S sent from the adders 74 and 76, and provides sum S24 and carry C24 at the 4th bit as outputs. The 4th bit adder 65 through 7th bit adder 67 have identical circuit construction.

In the 8th bit adder 68, carrys C are successively added, in the adders 81 through 83 the 9th bit is added, and in adder 84 the 10th bit is added. Then sums S21 through S2A obtained in the adders of the 1st bit adder 61 through 8th bit adder 68 and the carrys C21 through C2A are summed up in the 2-input high-speed adder 52 as shown in FIG. 8, to provide the final sum as 11-bit output.

Also in the multiple input adder circuit 2, adding operation similar to that in the 8-input adder circuit 50 shown in FIG. 8 is performed. The sum S and carry C obtained in the adders of the 1st bit adder 41 through the ith bit adder 4$i$ are summed up in the 2-input high-speed adder 40 of the carry look-ahead adder or the like, with the final sum |A−B| produced by the multiple input circuit is provided to the adder 3 as output. The carry look-ahead adder adds the addend and augend bit by bit, while at the same time calculating the carry independently, thereby to improve the speed of adding operation.

As described previously, absolute difference calculation circuit composed as shown in FIG. 3 used in an absolute difference accumulator circuit of the prior art needs an adder installed for each bit of input data and therefore requires i units of adders for the i bit subtractor as shown in FIG. 5, and i units of +1 incrementer as shown in FIG. 6, 2$i$ units in all. When the composition as shown in FIG. 4 is employed, too, i units of adder are installed for each i-bit subtractor and therefore 2$i$ units of adder are required for the two subtractors. Therefore, in the absolute difference accumulator circuit wherein N units of absolute difference calculation circuit shown in FIG. 2 are used, the portion of the absolute difference calculation circuit alone needs 2Ni units of adder.

As described above, the absolute difference accumulator circuit of the prior art has a problem of needing a large number of adders leading to increasing amount of circuitry, and imposing a limitation on the possible number of input data and the number of bits in each data.

SUMMARY OF THE INVENTION

The objective of the present invention is to provide an absolute difference accumulator circuit capable of reducing the number of adders required, reducing the amount of entire circuitry for the same amount of data and the same number of bits of each data, and enabling it to increase the amount of input data or the number of bits, for the same amount of circuitry.

The present invention provides an absolute difference accumulation circuit comprising:
(a) a plurality of absolute difference calculation circuits, each having
   (a1) an i-bit subtractor for calculating a difference of two numbers each having i bits, a value of i being a natural number; and
   (a2) an i-bit inversion selector in response to output of the i-bit subtractor for supplying from the i-bit subtractor in a case where no borrow output is supplied from the i-bit subtractor and for inverting every bit from the i-bit subtractor in a case where borrow output is supplied from the i-bits subtractor;
(b) a multiple input adder circuit in response to outputs of each absolute difference calculations circuit for receiving the borrow from each absolute difference calculation circuit as the least significant bit and for adding the results of each absolute difference calculation; and
(c) An accumulator circuit for summing up outputs of the multiple input adder circuit.

In preferred embodiment, the i-bit subtractor comprises i units of full adders.

In another preferred embodiment, the multiple input adder circuit comprises a Wallace Tree adder circuit.

In still another preferred embodiment, the multiple input adder circuit comprises a carry look-ahead adder.

In further preferred embodiment, the accumulator circuit comprises an adder for adding a result of addition from the multiple input adder to an contents of an accumulator, and the adder storing a result of addition from the adder into the accumulator.

The absolute difference accumulator circuit of the invention comprises a plurality of absolute difference calculation circuits, a multiple input adder circuit and an accumulator circuit. The i-bit subtractor of each absolute difference calculation circuit calculates the difference of two i-bit numbers. The bit inversion selector circuit provides the subtraction output of the i-bit subtractor as it is when no borrow output is produced by the i-bit subtractor, and provides the subtraction output of the i-bit subtractor after inverting each bit thereof when a borrow output is produced by the i-bit subtractor. Therefore when there is no borrow output produced, absolute value of the difference of the two numbers is provided as output and, when there is a borrow output 1's complement of the difference of the two numbers is provided as output. On the other hand, the multiple input adder receives the borrow from the absolute difference calculation circuit to the least significant bit and, at the same time, adds the results of calculations in the absolute difference calculation circuits. When a borrow is produced by an absolute difference calculation circuit, since the result of calculation in the absolute difference calculation circuit is 1's complement of the difference of two numbers, adding the borrow, namely 1, to the least significant bit means producing 2's complement of the difference, which is just equivalent to adding operation of the absolute value of the difference of the two numbers. When borrow output is not provided by the absolute difference calculation circuit, 0 is simply added to the least significant bit and therefore absolute value of the difference of two numbers is added. In this manner, the multiple input adder circuit obtains the sum of absolute values of the differences of a plurality of pairs of data. The calculation circuit sums up the outputs of the multiple input adder circuit to obtain the accumulator of the absolute values of differences.

According to the invention, as described above, an absolute difference calculation circuit to obtain the difference of two numbers provides 1's complement of the result of calculation to the multiple input adder when there is a borrow output. The borrow is supplied to the 1st bit adder of the multiple input adder, and the calculations of +1 incrementation to obtain 2's complement of the result of calculation are performed together in the 1st bit adder of the multiple input adder at the latter stage.

The invention thus makes it possible to greatly reduce the number of adders required to calculate the absolute value of difference and to greatly reduce the amount of entire circuitry. Also it is made possible to increase the amount of input data or the number of bits in each data, for a given amount of circuitry. The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawing, preferred embodiments of the invention are described below.

Figure 10:
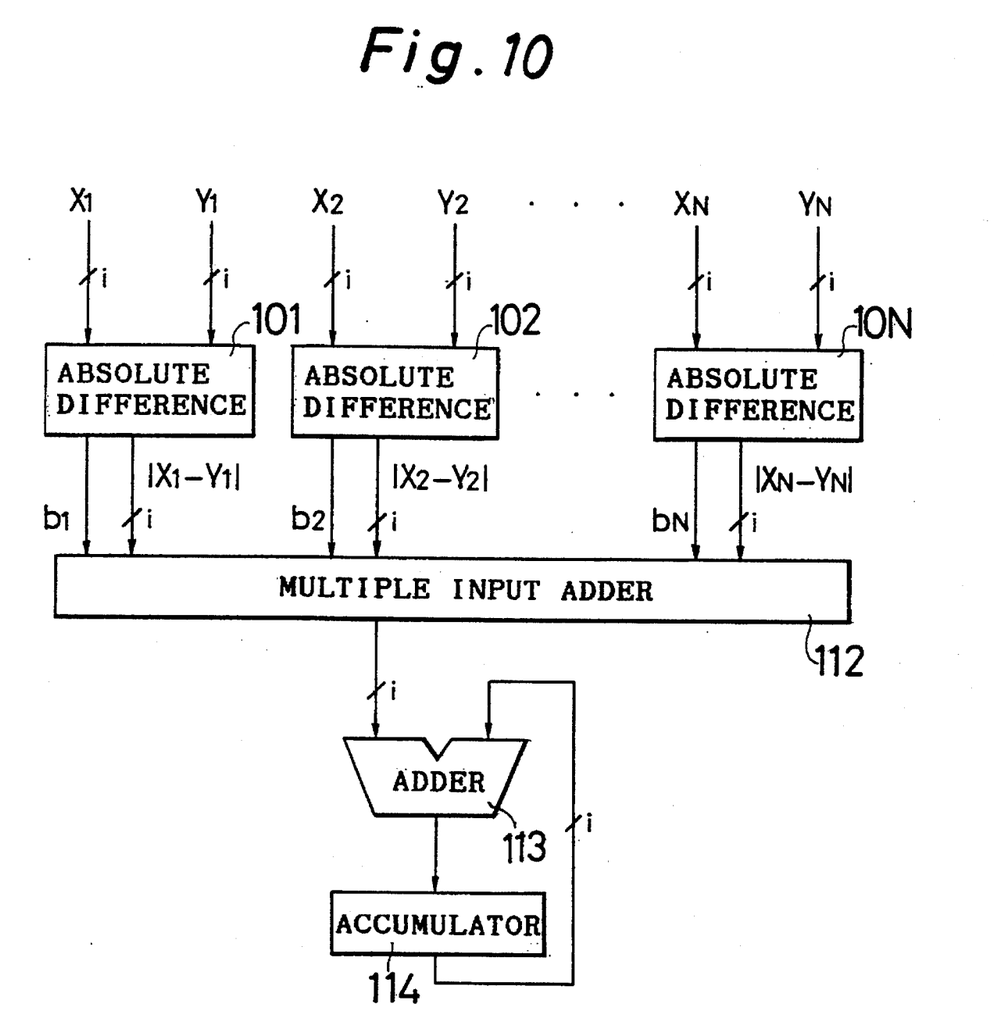
FIG. 10 shows the construction of the absolute difference calculation circuit exemplifying an embodiment of the invention.

FIG. 10 shows the construction of an absolute difference calculation circuit in a preferred embodiment of the invention. In FIG. 10, $X_1, X_2, \ldots, X_N$ represent N pieces of 1st input data each consisting of i bits, and $Y_1, Y_2, \ldots, Y_N$ represent N pieces of 2nd input data each consisting of i bits. In FIG. 10, numerals 101, 102, ... 10N denote absolute difference calculation circuit which provides absolute value of the difference of two numbers or 1's complement of the difference of two numbers as output together with borrow as will be described later, unlike the absolute difference calculation circuit 11, 12, ... 1N shown in FIG. 2 as the prior art. The multiple input adder 112 receives as input and adds the result of i-bit subtraction provided from the absolute difference calculation circuit 101, 102, ..., 10N and receives as input the borrows $b_1, b_2, \ldots b_N$ from the absolute difference calculation circuit 101, 102, ..., 10N to the least significant bit of the multiple input adder 112 and adds these borrows. Adder 113 stores the result of adding operation in the multiple input adder 112 into the accumulator 114 and, when the next result of adding operation in the multiple input adder 112 is received as input, adds the result of addition to the contents of the accumulator 114. Therefore accumulator of absolute values of differences can be obtained in the accumulator 114 by entering the 1st input data $X_1, X_2, \ldots, X_N$ and the 2nd input data $Y_1, Y_2, \ldots, Y_N$ using such circuit as described above. Affix 1 through N of the 150 input data $X_1, X_2, \ldots, X_N$ and the 2nd input data $Y_1, Y_2, \ldots, Y_N$ may be omitted to denote the input data collectively as X and Y.

Figure 11:
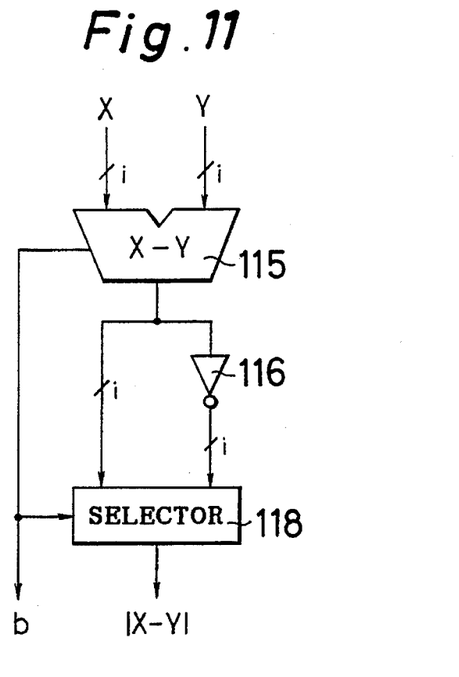
FIG. 11 shows an example of the construction of the absolute difference calculation circuit 101 through 10N shown in FIG. 10.

FIG. 11 shows the construction of the absolute difference calculation circuit shown in FIG. 10. In FIG. 11, numeral 115 denotes a subtractor which calculates X–Y. Numeral 116 denotes a bit inverter which inverts each bit of the result of subtracting i-bit numbers provided as output by the subtractor 115. When the result of subtraction in the subtractor 115 is positive (borrow b is 0), the selector 118 provides the value of X–Y as it is and, when the result of subtraction in the subtractor 115 is negative (borrow b is 1), the selector 118 provides the value which is bit-inverted by the bit inverter 116, namely 1's complement of X−Y together with the borrow. Outputs of the absolute difference calculation circuit will be collectively denoted as |X−Y|.

Figure 12:
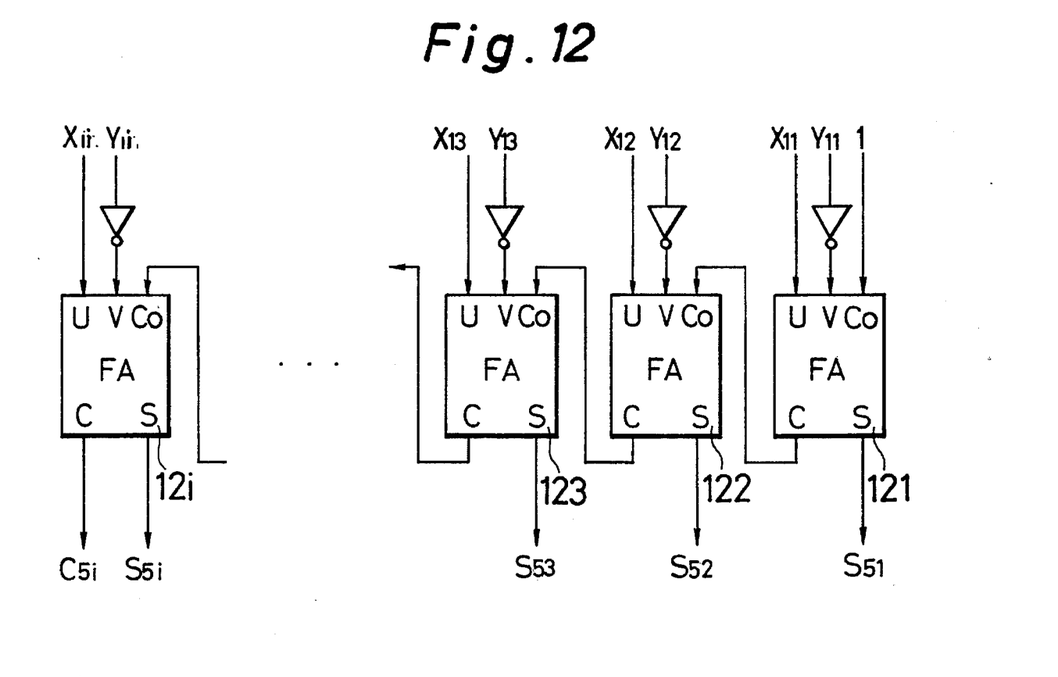
FIG. 12 shows an example of construction of i-bit subtractor 115 shown in FIG. 11.

FIG. 12 shows an example of circuit construction of the subtractor 115 of the absolute difference calculation circuit shown in FIG. 11. The subtractor 115 comprises i units of full adder (abbreviated as FA) and, when carry is generated in an adder, the carry is sent from the carry output terminal C of the adder wherein the carry was generated to the carry input terminal Co of the next more significant bit. Applied to the input terminals U of the adders 121 through 12$i$ are input data x11 through x1$i$ as minuend. Applied to the input terminal V are inverted values of input data y11 through y1$i$ ("0" if initial value is "1" or "1" if initial value is "0") as subtrahend. And the carry input terminal Co of the least significant bit receives 1, and 1 is added to the bit-inverted values of the input data y11 through y1$i$. Consequently as the input data x11 through x1$i$ and 2's complement of the input data y11 through y1$i$ are added, subtraction of the input data x11 through x1$i$ and the input data y11 through y1$i$ is performed. Upon subtraction, results of the subtraction S51 through S5$i$ and the carry C5$i$ are provided as output from the output terminals S of the adders 121 through 12$i$ and the carry output terminal of the adder 12$i$ of the most significant bit. If the result of subtraction is positive, carry C5$i$ is 1 and if the result is negative, carry C5$i$ is 0, thereby the sign can be determined by the value of carry C5$i$.

Figure 13:
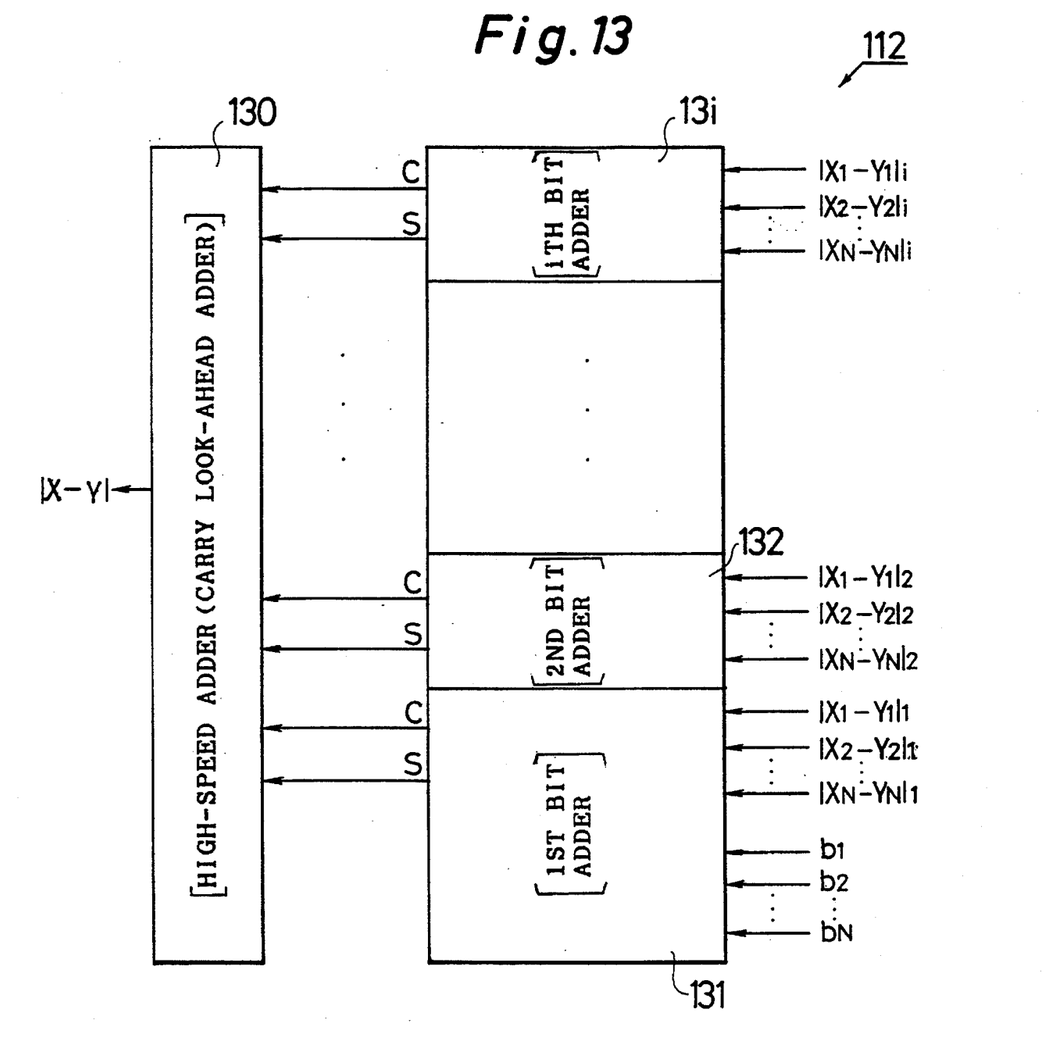
FIG. 13 shows an example of the construction of the multiple input adder 112 in FIG. 10.

FIG. 13 shows the construction of the multiple input adder 112 shown in FIG. 10. In FIG. 13, 1st bit adder 131, 2nd bit adder 132, ..., ith bit adder 13$i$ calculate |X−Y| for the 1st bit, 2nd bit, ..., ith bit, where |X−Y|i denotes the value of the ith bit of |X−Y|. The ith bit adder 13$i$ through 2nd bit adder 132 are multiple input adders of the same construction with N inputs. For example, the ith bit adder 13$i$ adds the ith bit of the result of calculation of N absolute difference calculation circuit, and the 2nd bit adder 132 adds the 2nd bit of the result of calculation of N absolute difference calculation circuit. The 1st bit adder 131 is a multiple input adder which acts on 2N inputs to add the 1st bit of the result of calculation of N absolute difference calculation circuit and add the borrows b1, b2, ..., bN which are outputs of each absolute difference calculation circuit.

Thus when a borrow is produced by the absolute difference calculation circuit, the multiple input adder 112 adds 1's complement of the result of calculation of the absolute difference calculation circuit and the borrow thereof, which is equivalent to calculating 2's complement of the result of calculation, thereby enabling it to obtain the absolute value of the result of calculation.

Figure 14:
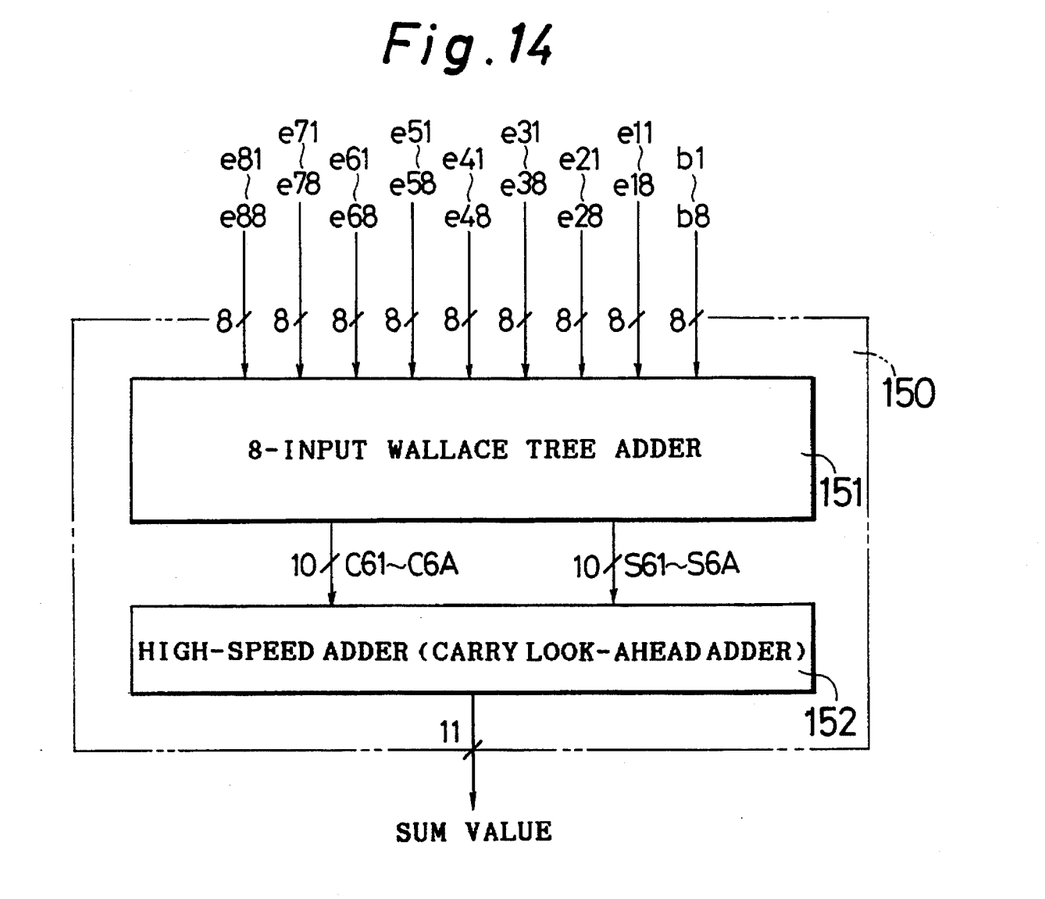
FIG. 14 shows an example of construction of the multiple input adder 112 in FIG. 13.
Figure 15:
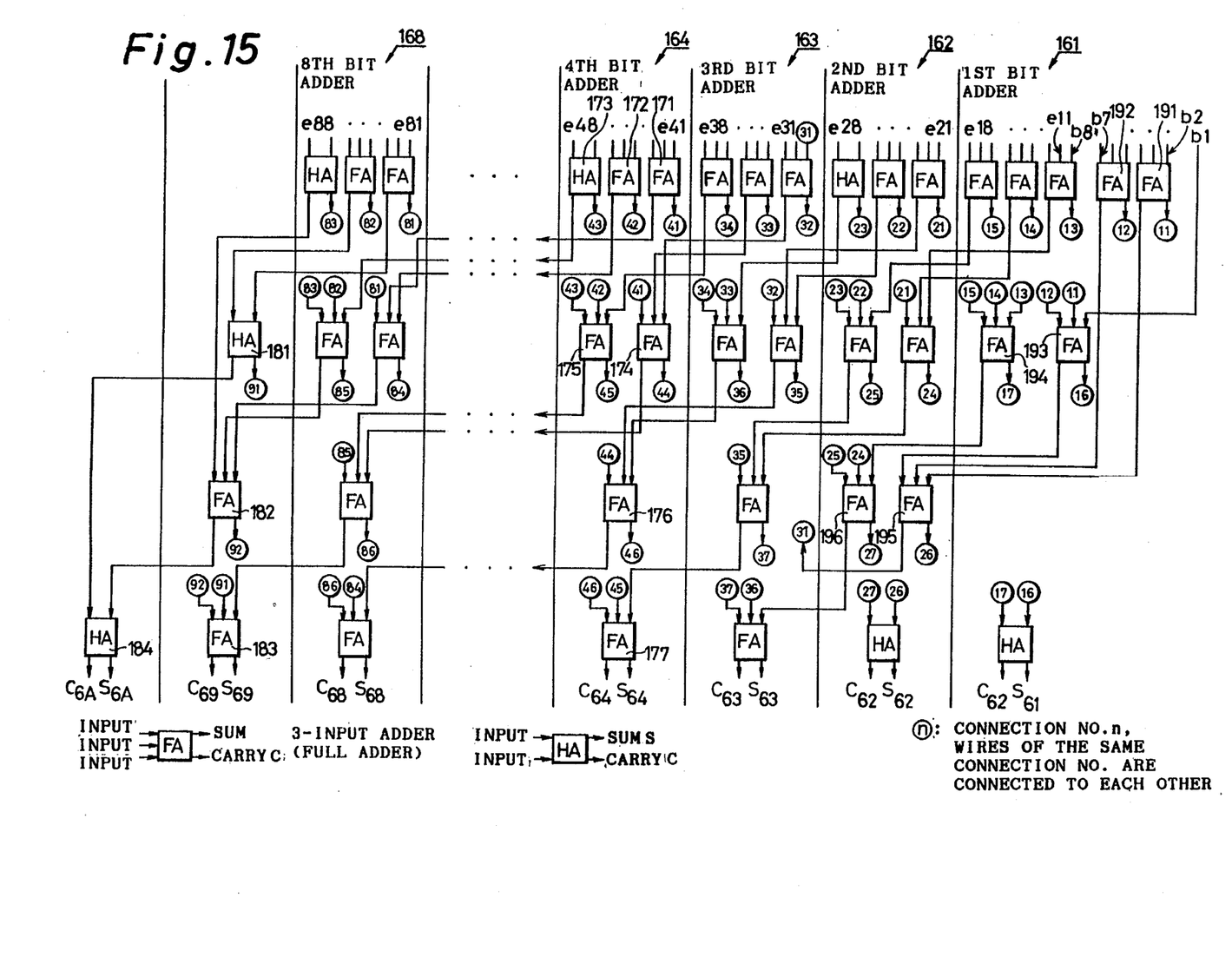
FIG. 15 shows an example of the circuit diagram of the 8-input Wallace Tree adder circuit 151 shown in FIG. 14.

For such a multiple input adder as described above, a Wallace Tree adder circuit can be used. FIG. 14 shows an example of construction of 8-input multiple input adder, where the number of inputs is actually 16 because the 1st bit adder receive the input of borrow. The 8-input adder 150 comprises an 8-input Wallace Tree adder circuit 151 and a 2-input high-speed adder (carry look-ahead adder) 152. FIG. 15 shows the circuit diagram of the 8-input Wallace Tree adder circuit 151.

The 8-input Wallace Tree adder circuit 151 comprises the 1st bit adder 161 through 8-bit adder 168, with the nth bit adder except for the 1st bit adder receiving input data en1 through en8 of the nth bit. The 1st bit adder receives input data e11 through e18 and borrows b1 through b8 as inputs. Each bit adder basically comprises a 3-input adder, and each adder successively adds the input data and carrys received as input from the adder of the next less significant bit, and provides the carry as output to the adder of the next more significant bit. The adders of each bit adder are organized in tree structure as shown in FIG. 15, wherein the number of inputs at a latter stage is reduced successively to eventually calculate the carry C and sum S and provide thereof as outputs at the last stage. By performing the addition in each bit adder as described above, number of adders can be reduced and the adding operation can be performed efficiently.

In the 4th bit adder 164, for example, adder 171 adds the input data e41 through e43, adder 172 adds the input data e44 through e47, and adder 173 adds the input data e47 and e48. The adders 171 through 173, upon adding the input data, send the sum S to the adders 174 and 175 and send carry C to the 5th bit adder 165. The adder 174 adds the carry C provided as input by the 3rd bit adder 163 and sum S provided as input from the adder 171. The adder 175 adds the carry C provided as input by the 3rd bit adder 163 and sum S provided as input from the adders 172 and 173. The adder 174, upon adding said data, sends the sum S to the adder 176 and send carry C to the 5th bit adder 165. The adder 175, upon adding said data, sends the sum S to the adder 177 as output and sends the carry C to the 5th bit adder 165. The adder 176 adds the carry C provided as input by the 3rd bit adder 163 and the sum S provided as input by the adder 174, and sends the resultant sum S to the adder 177 and sends carry C to the 5th bit adder 165. The adder 177 adds the carry C provided by the 3rd bit adder 163 and the sum S provided by the adder 175 and the adder 176, and provides as output the sum S64 at the 4th bit and carry C64. The 4th bit adder through the 7th bit adder have the identical circuit construction.

The 8th bit adder successively adds the carrys C, the adders 181 through 183 add the 9th bit and the adder 184 adds the 10th bit. Then the sums S61 through S6A obtained by the adders of the 1st bit adder 161 through 8th bit adder 168 and carrys C61 through C6A are summed up in the 2-input high-speed adder 152 as shown in FIG. 14, to provide the final sum in up to 11 bits.

Number of input data sets to the 1st bit adder 161 is the increment of borrow input data b1 through b8, namely 8 inputs, more than that for the 1st bit adder of the prior art shown in FIG. 9. As the borrow input data b1 through b8 increases, adders 191 through 194 are added in the 1st bit adder 161, and adders 195 and 196 are added in the 2nd bit adder 162 to sum the carrys C sent from the adders 191 through 194, resulting in total increase of six adders.

Also in the multiple input circuit 12, adding summing operation similar to that in the 8-input adder circuit 150 shown in FIG. 14. The sum S and carrys C calculated by the adders of the 1st bit adder 131 through ith bit adder 13$i$ are added successively by 2-input high-speed adder 130 such as carry look-ahead adder as shown in FIG. 13, and the final result of addition |X−Y| in the multiple input circuit can be sent to the adder 113. The carry look-ahead adder 52 adds the addend and augend bit by bit and, at the same time, independently calculates the carry, thereby improving the speed of adding operation.

The ith bit adder 13$i$, ..., 2nd bit adder 132 shown in FIG. 13 can be composed of a Wallace Tree adder circuit of N inputs, and the 1st bit adder 131 can be composed of a Wallace Tree adder circuit of 2N inputs. Because the Wallace Tree adder circuit increases the number of inputs by connecting adders in this manner, it enables it to restrict the number of adders required when one input is added within 1.

In contrast to the multiple input adder circuit 2 in the absolute difference accumulator circuit of the prior art as shown in FIG. 7, the multiple input adder circuit 112 in the absolute difference accumulator circuit of the present invention is different in that the number of inputs to the 1st bit adder 91 has increased from N to 2N due to the increase of inputs of borrows b1 through bn. Keeping step therewith, adders of the 1st bit adder 131 increase as in the example of construction shown in FIG. 15, the adders sending carry C to the 2nd bit adder 132, therefore the adders which add the carry C increase and the adders of the multiple input adder of the more significant bit increase similarly. The total increase of the adders in each bit adder can be estimated to be about N when the number of inputs to the 1st bit adder 91 increases by N.

The absolute difference calculation circuit of the present invention shown in FIG. 11 differs from the absolute difference calculation circuit of the prior art shown in FIG. 3 in that the +1 incrementer 7 is installed in the case of present invention. Accordingly, the +1 incrementer 7 of the absolute difference calculation circuit of the prior art is provided with i adders as shown in FIG. 6, and the absolute difference accumulator circuit shown in FIG. 2 is provided with N absolute difference calculation circuit 11 through 1N, so that the number of adders included in the absolute difference calculation circuit of the prior art is Ni more than that in the absolute difference calculation circuit of the invention. Moreover, the number of adders included in the absolute difference calculation circuit of the prior art shown in FIG. 4 is more than that in the absolute difference calculation circuit of the invention by the number of adders in the i-bit subtractor 9, namely i. Thus the number of adders included in the absolute difference calculation circuit of the prior art is Ni more than that in the absolute difference calculation circuit of the invention.

As described above, the number of adders included in the absolute difference calculation circuit of the present invention is less than that of the prior art by Ni in the absolute difference calculation circuit and by N in the multiple input adder, or Ni−N=(i−1)N less than the absolute difference calculation circuit of the prior art in total. Consequently, number of adders required in the absolute difference accumulator circuit of the invention is greatly reduced from that of the prior art, to about a half that of prior art when the number N of data sets is substantially large.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An absolute difference accumulation device comprising:
   (a) a plurality of absolute difference calculation circuits, each having
      (a1) an i-bit subtractor for calculating a difference of two numbers each having i bits, a value of i being a natural number; and
      (a2) an i-bit inversion selector, responsive to the difference from the i-bit subtractor, for supplying every difference bit in a case where no borrow is generated by the i-bit subtractor and for inverting every difference bit in a case where borrow is generated;
   (b) a multiple input adder circuit, responsive to each absolute difference calculation circuit, for adding together the borrows without inversion thereof and the outputs of the i-bit inversion selectors; and
   (c) an accumulator circuit for summing up outputs of the multiple input adder circuit.

2. An absolute difference accumulation device as claimed in claim 1, wherein:
   each i-bit subtractor comprises i units of full adders.

3. An absolute difference accumulations device as claimed in claim 1, wherein:
   the multiple input adder circuit comprises a Wallace Tree adder circuit.

4. An absolute difference accumulations device as claimed in claim 1, wherein:
   the multiple input adder circuit comprises a carry look-ahead adder.

5. The absolute difference accumulations device as claimed in claim 1, wherein:
   the accumulator circuit comprises an adder for adding a result of addition from the multiple input adder to an contents of an accumulator, and the adder storing a result of addition from the adder into the accumulator.

6. An absolute difference accumulation device as in claim 1, wherein:
   no operator is connected between the borrow output of the i-bit subtractor and the multiple input adder and between the i-bit inversion selector and the multiple input adder, such that no operation is performed on the borrows and the i-bit inversion selector outputs before the borrows and the selector outputs are input to the multiple input adder.

7. An absolute difference accumulating device, comprising:
   a plurality of difference calculation means, each
      for calculating a difference between two input values, generating a borrow bit of a zero value when the calculated difference is positive and generating a borrow bit of a value of one when the calculated difference is negative,
      for selecting one of the calculated difference and an inverted version of the calculated difference based upon the value of the generated borrow bit, and
      for outputting a selected one of the borrow bit and the inverted version of the calculated difference, and the borrow bit and the calculated difference, based upon the selection; and
   accumulating means for generating, from each of the plurality of difference calculation means, an absolute value of the calculated difference from a summation of each output of either the borrow bit and the inverted version of the calculated difference, or the borrow bit and the calculated difference.

8. The absolute difference accumulating device of claim 7, wherein each of the plurality of difference calculation means selects the calculated difference upon the borrow bit having a zero value and selects the inverted version of the calculated difference upon the borrow bit having a value of one.

9. The absolute difference accumulating device of claim 7, wherein the borrow bit is the least significant bit of the calculated difference.

10. The absolute difference accumulating device of claim 7, wherein each of the plurality of difference calculation means includes,
   a subtractor for calculating the difference between the two input values;

an inverter for generating an inverted version of the calculated difference; and a selector for selecting one of the calculated difference and the inverted version of the calculated difference.

11. The absolute difference accumulating device of claim 7, wherein the two input values, input into each of the plurality of difference calculation means, correspond to picture element values of a first image and picture element values of a second image.

12. The absolute difference accumulating device of claim 7, wherein the accumulating means includes a multiple input adder for generating the absolute value of the calculated difference for each of the plurality of difference calculation circuits, and an accumulator for summing the generated absolute values.

* * * * *